US009981651B2

(12) United States Patent
Johri et al.

(10) Patent No.: US 9,981,651 B2
(45) Date of Patent: May 29, 2018

(54) TORQUE MODIFICATION DURING AN UPSHIFT IN A HYBRID VEHICLE

(71) Applicant: Ford Global Technologies, LLC, Dearborn, MI (US)

(72) Inventors: Rajit Johri, Canton, MI (US); Mark Steven Yamazaki, Canton, MI (US); Jeffrey Allen Doering, Canton, MI (US); Bernard D. Nefcy, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 6 days.

(21) Appl. No.: 15/220,941

(22) Filed: Jul. 27, 2016

(65) Prior Publication Data

US 2018/0029587 A1 Feb. 1, 2018

(51) Int. Cl.
*B60W 20/13* (2016.01)
*B60K 6/387* (2007.10)
*B60K 6/40* (2007.10)
*B60K 6/46* (2007.10)
*B60W 10/06* (2006.01)
*B60W 10/08* (2006.01)

(52) U.S. Cl.
CPC .............. *B60W 20/13* (2016.01); *B60K 6/387* (2013.01); *B60K 6/40* (2013.01); *B60K 6/46* (2013.01); *B60W 10/06* (2013.01); *B60W 10/08* (2013.01); *B60W 2510/0208* (2013.01); *B60W 2510/1005* (2013.01); *B60W 2510/1095* (2013.01); *B60W 2710/0666* (2013.01); *B60W 2710/083* (2013.01); *B60Y 2200/92* (2013.01); *B60Y 2300/188* (2013.01); *Y10S 903/914* (2013.01); *Y10S 903/93* (2013.01); *Y10S 903/951* (2013.01)

(58) Field of Classification Search
CPC ............ B60K 6/40; B60K 6/46; B60K 6/387; B60W 10/06; B60W 10/08; B60W 20/13; B60W 2520/0208; B60W 2520/1005; B60W 2520/1095; B60W 2710/0666; B60W 2710/083; B60Y 2200/92; B60Y 2300/188; Y10S 903/914; Y10S 903/93; Y10S 903/951
USPC .......................................................... 701/22
See application file for complete search history.

(56) References Cited

U.S. PATENT DOCUMENTS

| 8,315,755 | B2 | 11/2012 | Hirata et al. | |
|---|---|---|---|---|
| 8,469,858 | B2 | 6/2013 | Yang et al. | |
| 2005/0255964 | A1* | 11/2005 | Heap | B60K 6/445 477/3 |
| 2005/0256618 | A1* | 11/2005 | Hsieh | G01R 31/343 701/22 |

(Continued)

*Primary Examiner* — Atul Trivedi
(74) *Attorney, Agent, or Firm* — David B. Kelley; Brooks Kushman P.C.

(57) ABSTRACT

A control system is provided to account for differences in engine response times and motor response times during an upshift in a transmission. A vehicle includes a driveline that has an engine, a traction motor, and a transmission selectively connected in series. A control area network (CAN) connects a plurality of controllers. At least one of the controllers is programmed to, during an upshift in the transmission, output signals over the CAN to reduce torque of the traction motor. The controller also reduces the engine torque based on signal delays in the CAN.

20 Claims, 3 Drawing Sheets

(56) References Cited

U.S. PATENT DOCUMENTS

| | | | | |
|---|---|---|---|---|
| 2009/0118932 A1* | 5/2009 | Heap | ............ | B60K 6/26 |
| | | | | 701/54 |
| 2009/0118936 A1* | 5/2009 | Heap | ............ | B60K 6/26 |
| | | | | 701/54 |
| 2009/0233757 A1* | 9/2009 | Soliman | ............ | B60K 6/442 |
| | | | | 477/3 |
| 2009/0326778 A1* | 12/2009 | Soliman | ............ | B60K 6/442 |
| | | | | 701/84 |
| 2013/0096790 A1* | 4/2013 | Nelson | ............ | F16H 63/50 |
| | | | | 701/58 |
| 2014/0018207 A1* | 1/2014 | Kobayashi | ............ | B60K 6/48 |
| | | | | 477/5 |
| 2015/0126329 A1* | 5/2015 | Johri | ............ | B60W 10/08 |
| | | | | 477/5 |
| 2015/0149008 A1 | 5/2015 | Jang | | |
| 2015/0360690 A1* | 12/2015 | Nefcy | ............ | B60W 10/06 |
| | | | | 477/3 |
| 2016/0107633 A1* | 4/2016 | Liang | ............ | B60W 20/10 |
| | | | | 701/22 |

\* cited by examiner

US 9,981,651 B2

TORQUE MODIFICATION DURING AN UPSHIFT IN A HYBRID VEHICLE

TECHNICAL FIELD

The present disclosure is directed to altering engine torque and motor torque in a hybrid electric vehicle during an upshift.

BACKGROUND

A hybrid vehicle can include an engine and a traction motor, both capable of providing power to propel the vehicle. A transmission with distinct gear ratios may also be provided. During an upshift shift in an MHT vehicle, both the engine torque and motor torque can be commanded to change in order to account for an upcoming change in inertia realized due to the shift.

SUMMARY

According to an embodiment, a vehicle includes an engine, a transmission capable of upshifting, and a traction motor selectively coupled to the engine and to the transmission. At least one controller is programmed to, during an upshift when both the engine and motor are propelling the vehicle, command a reduction in motor torque and then, after a controllable delay, command a reduction in engine torque.

The at least one controller may be programmed to alter the delay such that an actual motor-torque reduction occurs simultaneous with an actual engine-torque reduction.

The at least one controller may be configured to communicate with other controllers via a control area network (CAN), wherein the at least one controller is programmed to alter the delay to account for response lags in the CAN.

According to another embodiment, a vehicle includes a driveline that has an engine, a traction motor, and a transmission selectively connected in series. A control area network (CAN) connects a plurality of controllers. At least one of the controllers is programmed to, during an upshift in the transmission, output signals over the CAN to reduce torque of the traction motor. The controller also reduces the engine torque based on signal delays in the CAN.

In yet another embodiment, a method includes first reducing pressure in an offgoing clutch of a transmission while increasing pressure in an oncoming clutch of the transmission to commence an upshift in a vehicle having an engine selectively coupled to a motor that is selectively coupled to the transmission. The method also includes, during the upshift, commanding a reduction in motor torque and then, after a controllable delay, commanding a reduction in engine torque.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
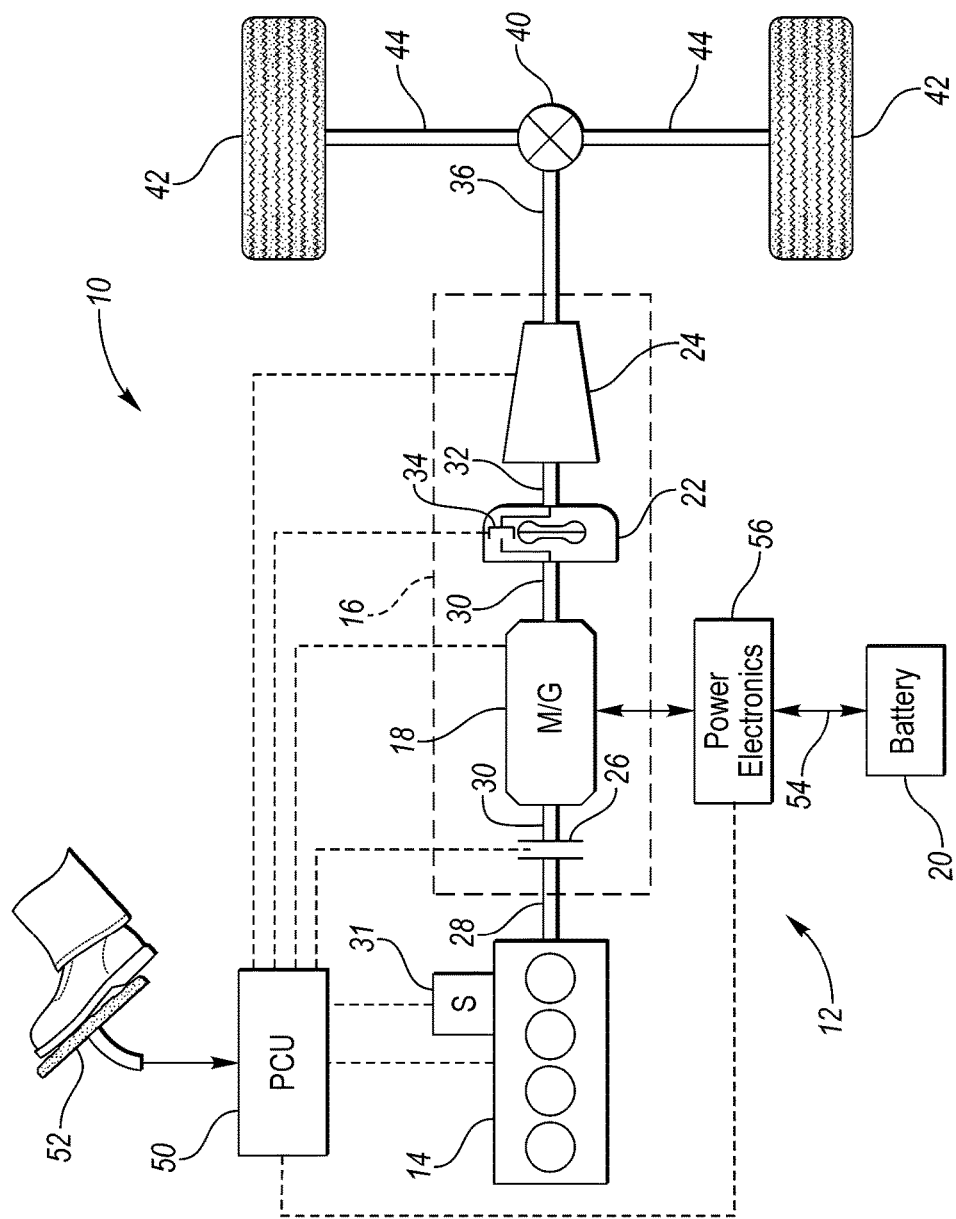
FIG. 1 is a schematic of a hybrid electric vehicle, according to one embodiment of the present disclosure.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24. The engine 14, M/G 18, torque converter 22, and the automatic transmission 16 are connected sequentially in series, as illustrated in FIG. 1.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

A separate starter motor 31 can be selectively engaged with the engine 14 to rotate the engine to allow combustion to begin. Once the engine is started, the starter motor 31 can be disengaged from the engine via, for example, a clutch (not shown) between the starter motor 31 and the engine 14. In one embodiment, the engine 14 is started by the starter motor 31 while the disconnect clutch 26 is open, keeping the engine disconnected with the M/G 18. Once the engine has started and is brought up to speed with the M/G 18, the disconnect clutch 26 can couple the engine to the M/G to allow the engine to provide drive torque.

In another embodiment, the starter motor 31 is not provided and, instead, the engine 14 is started by the M/G 18. To do so, the disconnect clutch 26 partially engages to transfer torque from the M/G 18 to the engine 14. The M/G 18 may be required to ramp up in torque to fulfill driver demands while also starting the engine 14. The disconnect clutch 26 can then be fully engaged once the engine speed is brought up to the speed of the M/G.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle, this operation mode may be referred to as the "engine mode," "engine-only mode," or "mechanical mode."

The M/G 18 may assist the engine 14 by providing additional power to turn the shaft 30. This operation mode may be referred to as a "hybrid mode," an "engine-motor mode," or an "electric-assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only mode," "EV (electric vehicle) mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, and/or the M/G 18 may be provided between the torque converter 22 and the gearbox 24. Other configurations are contemplated without deviating from the scope of the present disclosure.

Figure 2:
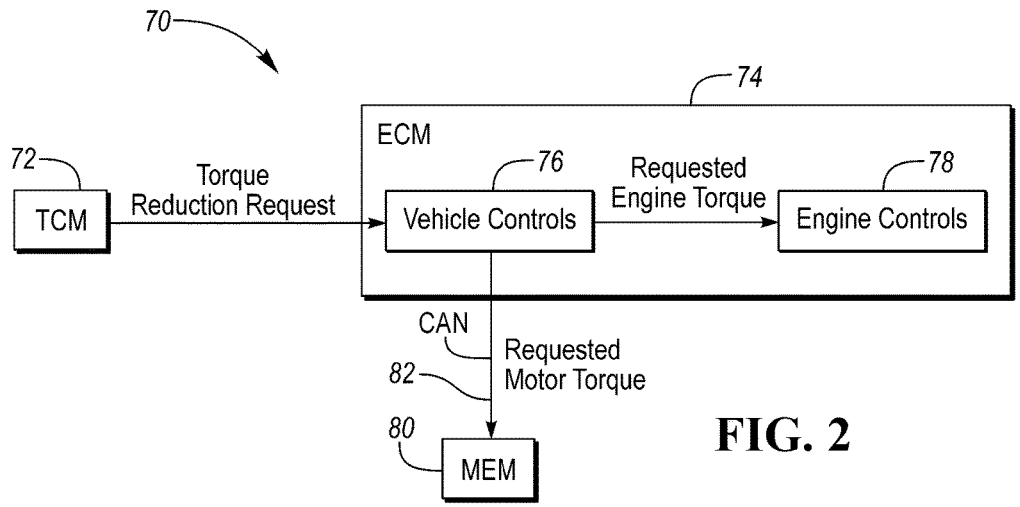
FIG. 2 is a diagram illustrating a control architecture for controlling an engine and a traction motor of the hybrid electric vehicle, according to one embodiment.

As explained above, the "controller" of this disclosure can refer to multiple controllers. Each individual controller can be communicatively coupled to another controller or control module to perform various functions and controls in the hybrid vehicle. FIG. 2 shows one embodiment of a control architecture 70 for controlling the engine 14 and M/G 18 of the vehicle. This control architecture 70 can perform functions while the vehicle is being operated, including making decisions and providing torque output requests to both the engine and the motor to efficiently power the vehicle. As will be described below, during a commanded upshift in the transmission, the overall torque output by the engine and/or motor may be required to slightly reduce.

To request such a torque reduction, a transmission controller or transmission control module (TCM) 72 provides an overall torque reduction request to the engine control module (ECM) 74. The ECM can be programmed to execute various commands based on data representing vehicle driving conditions, as will be described below. This is done by utilizing vehicle controls 76 which can request a change in torque from either or both of the engine and M/G. In particular, the vehicle controls 76 can provide a change in requested engine torque to engine controls 78 which directly controls operation of the engine, and a change in requested motor torque to a motor control module (MCM) 80 that directly controls operation of the M/G. In one example, the engine controls 78 can reduce torque output from the engine by retarding a spark in the engine. And, the MCM 80 can reduce torque output from the M/G by issuing commands to reduce rotational resistance in the windings.

During an upshift in the transmission (e.g., from $3^{rd}$ gear to $4^{th}$ gear), the overall input torque to the transmission 24 should be reduced to compensate for the change in inertia (i.e., the inertia torque) as the engine (or impeller, in case the engine is not connected) speed changes from a higher speed to a lower speed due to the upshift. In conventional, non-hybrid vehicles, an engine controller can issue commands to modify the engine torque by retarding the spark in the engine. This provides an instantaneous reduction in torque. In hybrid vehicles, such as the vehicle 10 of FIG. 1, the transmission input torque modification can be done through the M/G alone, engine alone, or a combination of the M/G and engine spark retard by utilizing the ECM 74 and MCM 80.

The controls in the vehicle 10 are responsible for meeting the desired transmission torque modification, and for calculating a split between engine spark retard and motor (M/G) torque reduction to meet the desired torque modification. The split can depend on various factors, such as motor torque limits, battery charge/discharge power limits, engine spark authority, etc. Additionally, the split between engine-torque reduction and motor-torque reduction can be dynamic for two similar shifts. For good drivability with an upshift, it is desirable to expect a consistent response for a same torque modification request from transmission controls without being affected by how the torque modification is met. Quality of a particular shift should be independent of whether the torque modification is done by the motor, by the engine, or by combination of both.

The dynamic response time of engine-torque reduction requests and motor-torque reduction requests may not be equivalent due to different actuator dynamics, such as rate limits and response lag. From the time commands are sent from the vehicle controls, there may be different communication delays when comparing the moment that the torque reduction is realized by the engine and the moment that the torque reduction is realized by the M/G. In other words, once a torque-reduction request is sent, the actual engine-torque reduction may occur sooner than the actual motor-torque reduction. For example, in the control architecture of FIG. 2, a control area network (CAN) 82 may interconnect the vehicle controls 76 of the ECM 74 with the MCM 80. There may be some inherent delays in the CAN 82 to process the signals, determine the proper amount of motor-torque reduction required, etc. These delays in the CAN can inadvertently create an additional response lag between command and actual response in motor as compared to engine. There can also be slew rates in the M/G that cause a time lag until the torque reduction is actual realized. These lags can cause a first torque reduction in the engine, followed by a second torque reduction in the M/G, which can degrade drivability during the upshift.

Therefore, according to various embodiments of this disclosure, a control scheme and algorithms are provided to account for the differences in engine response times and motor response times in response to a shared request from vehicle controls to reduce torque. According to the teachings of this disclosure, the delays and lags between the engine-torque reduction and motor-torque reduction during an upshift are corrected and improved, improving shift torque modifications and drivability.

Figure 3:
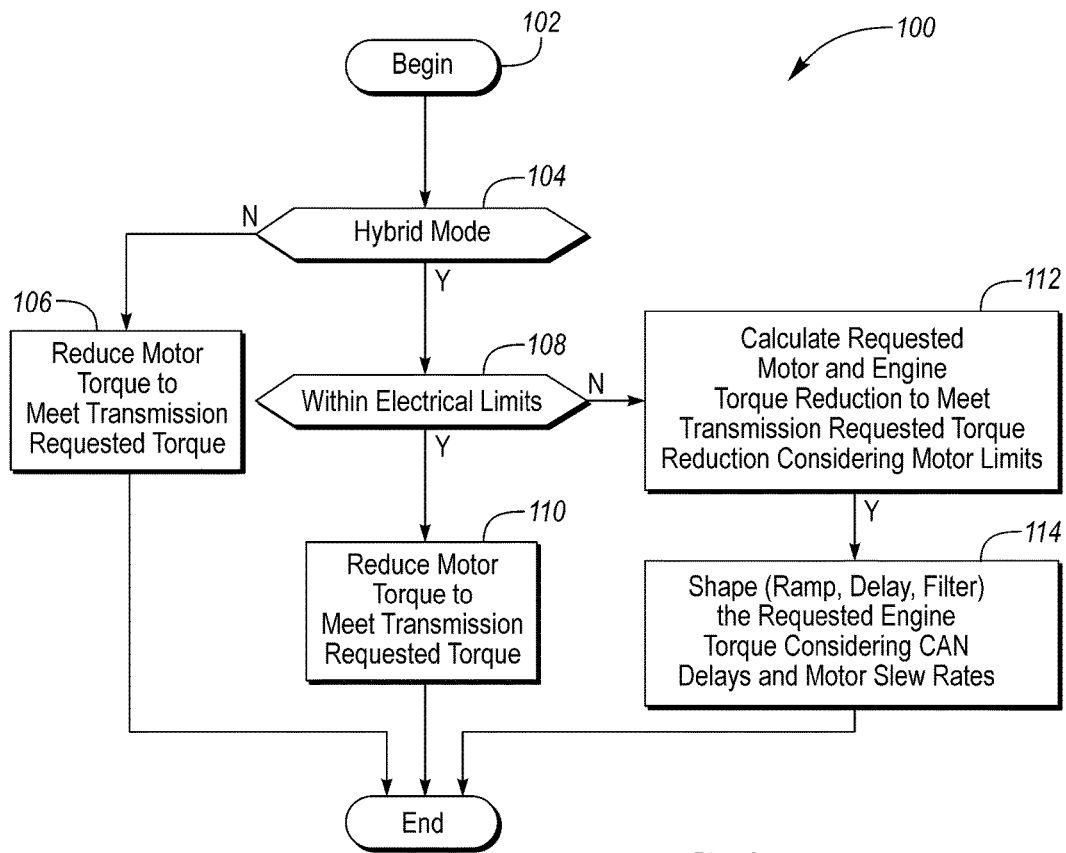
FIG. 3 is a flow chart illustrating an example of an algorithm programmed to control motor torque and engine torque during an upshift in the transmission, according to one embodiment.

FIG. 3 shows an example of an algorithm 100 implemented by one or more of the controllers described above. The algorithm begins at 102 at the commencement of a requested upshift event, for example. At 104, the controller determines whether the vehicle is being operated in a hybrid mode (described above) in which the engine 14 is on, and both the engine 14 and M/G 18 are outputting drive torque to propel the vehicle. If the vehicle is not being driven in the hybrid mode and is instead being driven in the electric-only mode in which the engine is not actively providing torque, then at 106 the controller commands a motor-torque reduction of the M/G to meet the requested transmission input torque requirements. The M/G alone can reduce its torque output so that the overall transmission torque input is reduced during the upshift.

If, however, the vehicle is being operated in the hybrid mode, then the controller compares the state-of-charge of the battery 20 to boundary thresholds at 108. For example, the controller can receive a signal representative of the current state-of-charge of the battery 20, and determine whether that state-of-charge is between a minimum state-of-charge threshold and a maximum state-of-charge threshold. In one example, the minimum threshold is 20% and the maximum threshold is 80% of full charge in the battery. If the state-of-charge of the battery is indeed within the electrical limits and between the thresholds, then at 110 the controller commands the motor torque to reduce to meet the transmission requested torque, similar to 106 described above. The engine is not commanded to reduce in torque output, and the change in transmission input torque can be made entirely by the M/G.

It is at this time, prior to the algorithm proceeding to 112, that other perameters can be checked to see if the M/G alone (e.g., without the engine) can reduce its torque output to meet the overall torque reduction required by the transmission input. For example, the controller can command the M/G to reduce its torque output without a reduction in engine torque in response to the motor being operating within certain motor torque limits. In another example, the controller can command the M/G to reduce its torque output without a reduction in engine torque in response to a constraint on the authority to utilize spark retarding (i.e., if certain conditions are present that would prevent spark retard).

If the algorithm is to proceed to 112, then the controller calculates the proper amount of requested motor-torque and engine-torque reduction necessary to meet the overall transmission input requested torque reduction, considering the electrical limits of the M/G. At 112, a proper split of engine-torque reduction and motor-torque reduction is requested at the engine and the M/G, respectively. Then, at 114, the controller shapes the requested engine-torque reduction to account for the CAN delays and slew rates in the M/G described above. To "shape" the requested engine-torque reduction, the controller can ramp-down, delay, or place a filter on the requested engine-torque reduction signals. This effectually slows down or delays the request for engine spark retarding, to better align the time in which the actual engine torque reduction is realized with the time in which the actual motor-torque reduction is realized.

In accomplishing this shaping (ramping, delaying, filtering), the controller can be programmed to, during the upshift when both the engine and motor are propelling the vehicle, command the motor-torque reduction. Thereafter, after a controllable delay, the controller can command the engine-torque reduction. The controller can alter the amount of time delay such that the actual motor-torque reduction occurs simultaneous with an actual engine-torque reduction.

Figure 4:
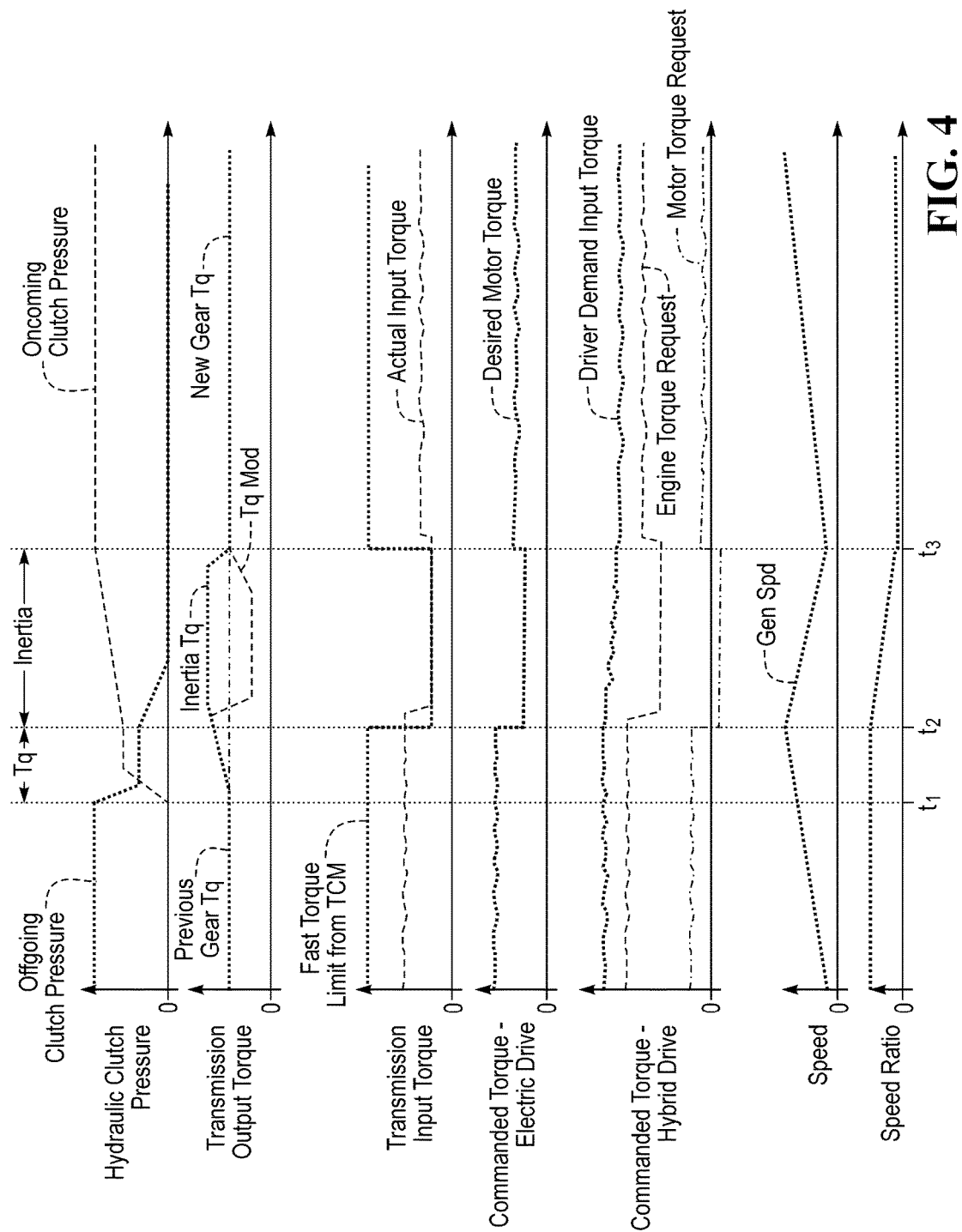
FIG. 4 is a plurality of grams of commanded and actual activities of various components during a commanded upshift, according to an embodiment.

FIG. 4 illustrates signal plots or graphs of commanded and actual activities of various components during a commanded upshift. An upshift begins with a torque phase (labeled Tq) at time $t_1$. During the torque phase, pressure is applied to an oncoming clutch. The transmission input torque is split between the offgoing clutch (i.e., the clutch being opened) and the oncoming clutch (i.e., the clutch being closed) until the pressure generally levels off. By the end of the torque phase at time $t_2$, an inertia phase begins in which the torque carried by the offgoing clutch drops to zero and all of the torque is carried by the oncoming clutch. The inertia phase ends at time $t_3$, at which time the clutch pressure is maintained and carried through; the upshift is complete.

Two graphs are also provided that illustrate the commanded torque outputs by the engine and motor in both the electric-drive mode (i.e., the M/G but not the engine is not propelling the vehicle) and in the hybrid-drive mode (i.e., both the M/G and the engine are propelling the vehicle). During the electric-drive mode, the controller can simply command a motor-torque reduction at $t_2$ to fulfill the necessary overall torque reduction required by the transmission. CAN delays and slew (described above) may cause causes a slight delay in the reduction of actual transmission input torque realized. This is shown in the graph of the transmission input torque, with the actual input torque reducing slightly after $t_2$.

Under similar driving conditions, the same torque modifications made during a hybrid-drive mode are shown in the subsequent graph. At $t_2$, the controller commands a motor-torque reduction. In order to account for the CAN delays and slew in the M/G, the controller delays the request for engine-torque reductions to occur slightly after $t_2$. The delay in the engine-torque-reduction command is the difference in time between $t_2$ and the time in which the engine torque request starts reducing slightly after $t_2$. This delay allows the overall transmission input torque to match the actual input torque that was realized during the electric-drive mode described above.

Embodiments described above elate to shaping the engine torque (e.g., step 114). In certain embodiments, the motor response could be equal to or faster than the engine response (e.g., in a situation in which the motor controls, engine controls, and vehicle controls are all accomplished by the same control module). In such scenarios, the motor torque may need to be shaped instead of the engine torque.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle comprising:
    an engine;
    a transmission;
    a traction motor selectively coupled to the engine and to the transmission; and
    at least one controller programmed to, during an upshift in the transmission when both the engine and motor are propelling the vehicle, command a reduction in motor torque and then, after a delay, command a reduction in engine torque.

2. The vehicle of claim 1, wherein the at least one controller is programmed to alter the delay such that an actual motor-torque reduction occurs simultaneous with an actual engine-torque reduction.

3. The vehicle of claim 1, wherein the at least one controller is configured to communicate with other controllers via a control area network (CAN), and wherein the at least one controller is programmed to alter the delay to account for response lags in the CAN.

4. The vehicle of claim 1, further comprising a traction battery coupled to the traction motor, wherein the at least one controller is further programmed to controllably reduce the engine torque in response to a state-of-charge of the battery being between a lower threshold and an upper threshold.

5. The vehicle of claim 4, wherein the at least one controller is further programmed to reduce the motor torque without reducing the engine torque in response to the state-of-charge being outside of the lower and upper thresholds.

6. The vehicle of claim 1, wherein the at least one controller is further programmed to controllably reduce the motor torque while the engine and the traction motor are both propelling the vehicle.

7. The vehicle of claim 6, wherein the at least one controller is further programmed to reduce the motor torque without reducing the engine torque during the upshift when the traction motor is propelling the vehicle and the engine is not propelling the vehicle.

8. The vehicle of claim 1, wherein the upshift includes a torque phase and a subsequent inertia phase, and the reduction in the motor torque and the engine torque occurs during the inertia phase of the upshift.

9. A vehicle comprising:
a driveline having an engine, a traction motor, and a transmission selectively connected in series; and
a control area network (CAN) connecting a plurality of controllers;
wherein at least one of the controllers is programmed to, during an upshift in the transmission,
output signals over the CAN to reduce traction-motor torque, and
controllably reduce engine torque based on signal delays in the CAN.

10. The vehicle of claim 9, wherein the at least one of the controllers is programmed to controllably reduce the engine torque subsequent to the signals being output.

11. The vehicle of claim 9, further comprising a traction battery coupled to the traction motor, wherein the at least one of the controllers is further programmed to controllably reduce the engine torque in response to a state-of-charge of the battery being between a lower threshold and an upper threshold.

12. The vehicle of claim 11, wherein the at least one of the controllers is further programmed to reduce the traction-motor torque without reducing engine torque in response to the state-of-charge being outside of the lower and upper thresholds.

13. The vehicle of claim 9, wherein the at least one of the controllers is further programmed to output the signals and controllably reduce the traction-motor torque while the engine and the traction motor are both propelling the vehicle.

14. The vehicle of claim 13, wherein the at least one of the controllers is further programmed to reduce the traction-motor torque without reducing the engine torque during the upshift when the traction motor is propelling the vehicle and the engine is not propelling the vehicle.

15. The vehicle of claim 9, wherein the upshift includes a torque phase and a subsequent inertia phase, and the signals are output and the engine torque is reduced the inertia phase of the upshift.

16. A method comprising:
reducing pressure in an offgoing clutch of a transmission while increasing pressure in an oncoming clutch of the transmission to commence an upshift in a vehicle having an engine selectively coupled to a motor that is selectively coupled to the transmission; and
during the upshift, commanding a reduction in motor torque and then, after a delay, commanding a reduction in engine torque.

17. The method of claim 16, further comprising propelling the vehicle via the engine and the motor during the upshift.

18. The method of claim 16, further comprising sending motor-torque signals between controllers via a control area network (CAN), and altering the delay based on response lags in the CAN.

19. The method of claim 16, further comprising powering the motor via a traction battery, and reducing the engine torque when a state-of-charge of the battery is between a lower threshold and an upper threshold.

20. The method of claim 19, further comprising reducing the motor torque without reducing the engine torque in response to the state-of-charge being outside of the lower and upper threshold.

* * * * *